United States Patent
Kong (10) Patent No.: US 10,319,954 B2
(45) Date of Patent: Jun. 11, 2019

(54) BATTERY CELL FOR SECONDARY BATTERY AND BATTERY PACK HAVING THE SAME

(71) Applicant: SK INNOVATION CO., LTD., Seoul (KR)

(72) Inventor: Mingzhe Kong, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 299 days.

(21) Appl. No.: 14/250,674

(22) Filed: Apr. 11, 2014

(65) Prior Publication Data

US 2014/0315074 A1   Oct. 23, 2014

(30) Foreign Application Priority Data

Apr. 18, 2013  (KR) .................. 10-2013-0042696

(51) Int. Cl.
*H01M 2/02* (2006.01)
*H01M 10/04* (2006.01)
*H01M 10/0585* (2010.01)

(52) U.S. Cl.
CPC ....... *H01M 2/0207* (2013.01); *H01M 2/0275* (2013.01); *H01M 10/0436* (2013.01); *H01M 10/0585* (2013.01); *H01M 2/021* (2013.01); *H01M 2/0212* (2013.01); *H01M 2002/0205* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 6,224,995 B1 * | 5/2001 | Fauteux | ............. | H01M 4/0442 29/623.1 |
| 2011/0287308 A1 * | 11/2011 | Kim | ............. | B29C 43/18 429/176 |
| 2013/0295436 A1 * | 11/2013 | Kwon | ............. | H01M 2/266 429/159 |
| 2014/0011070 A1 * | 1/2014 | Kim | ............. | H01M 2/0212 429/152 |
| 2014/0099525 A1 * | 4/2014 | Kwon | ............. | H01M 10/04 429/94 |

FOREIGN PATENT DOCUMENTS

| | | | | |
|---|---|---|---|---|
| JP | 2004111219 | | 4/2004 | |
| JP | 2004-111219 | * | 5/2004 | ............ H01M 10/04 |
| KR | 10-2002-0003606 | | 1/2002 | |
| KR | 101106324 | | 1/2012 | |
| WO | 2013141528 | | 9/2013 | |

OTHER PUBLICATIONS

Machine translation of JP2004-111219 printed Jan. 11, 2016.*
European Search Report—European Application No. 14164981.4 dated Aug. 25, 2014, citing JP 2004 111219, WO 2013/141528 and US 2013/295436.
Office Action issued by the Korean Intellectual Property Office dated Dec. 7, 2018.

* cited by examiner

*Primary Examiner* — Maria Laios
(74) *Attorney, Agent, or Firm* — IP & T Group LLP (57) ABSTRACT

Provided are a battery cell for a secondary battery and a battery pack having the same, and more particularly, a battery cell for a secondary battery including a case having an electrode assembly space having the same shape as an electrode assembly, and a battery pack having the same.

2 Claims, 6 Drawing Sheets

BATTERY CELL FOR SECONDARY BATTERY AND BATTERY PACK HAVING THE SAME

CROSS-REFERENCE TO RELATED APPLICATIONS

This application claims priority under 35 U.S.C. § 119 to Korean Patent Application No. 10-2013-0042696, filed on Apr. 18, 2013, in the Korean Intellectual Property Office, the disclosure of which is incorporated herein by reference in its entirety.

TECHNICAL FIELD

The following disclosure relates to a battery cell for a secondary battery and a battery pack having the same, and more particularly, to a battery cell for a secondary battery including a case having an electrode assembly space having the same shape as an electrode assembly, and a battery pack having the same.

BACKGROUND

Generally, a secondary battery may be rechargeable and have increased capacity. A representative example of the secondary battery includes a nickel cadmium battery, a nickel hydrogen battery, a lithium ion battery, and the like. Among them, the lithium ion battery has been spotlighted as the next generation power source due to excellent characteristics such as a long lifespan, high capacity, and the like. Among them, a lithium secondary battery, which has operating voltage of 3.6 V or more, is used as a power supply of a portable electronic device or several lithium secondary batteries are connected in series with each other to thereby be used for a high output hybrid vehicle. Since this lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has rapidly increased.

The lithium secondary battery may be manufactured in various types. A representative type of the lithium secondary battery may include a cylindrical type and a prismatic type that are mainly used for the lithium ion battery. A lithium polymer battery that has been recently spotlighted is manufactured in a pouch type having flexibility, such that it has a relatively free shape. In addition, the lithium polymer battery has excellent stability and light weight, such that it is advantageous for slimness and lightness of the portable electronic device.

Figure 1:
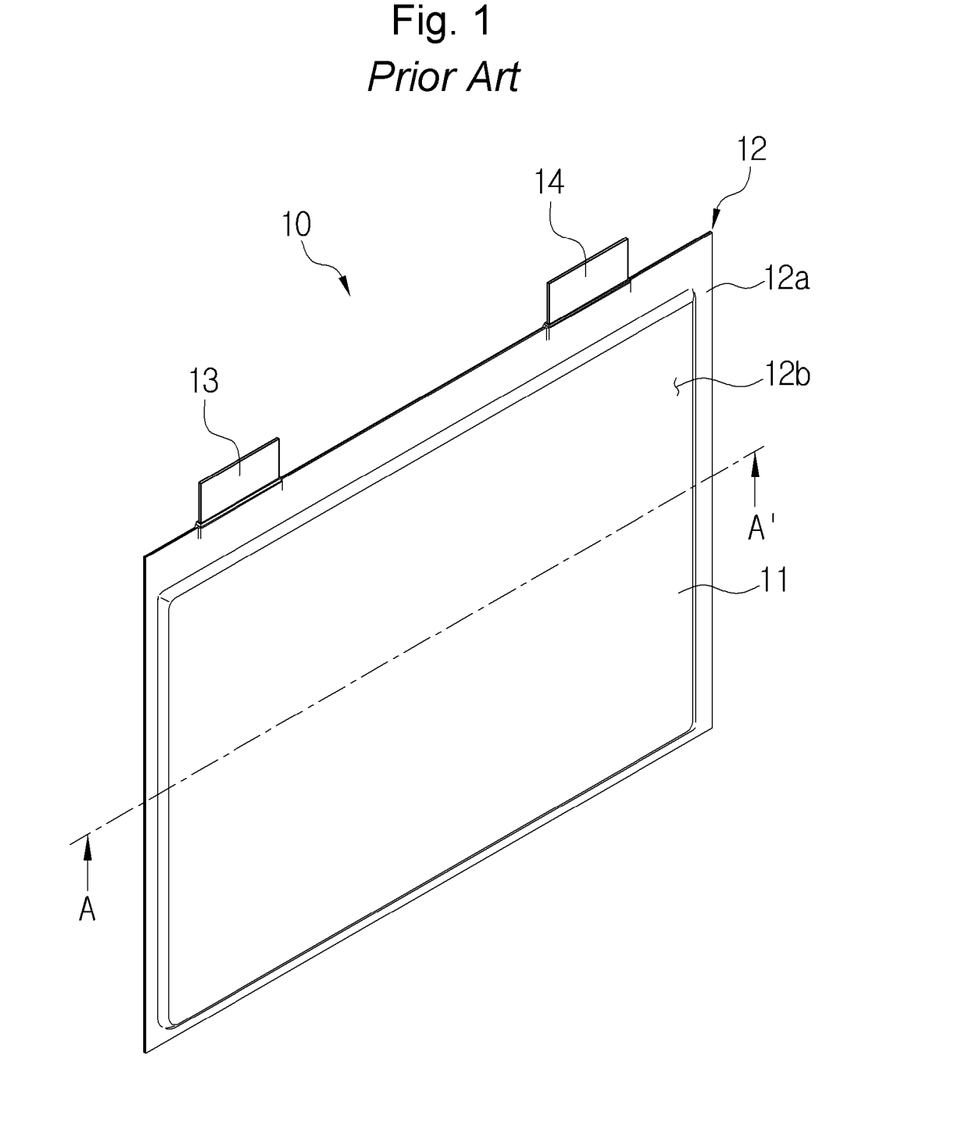
FIG. 1 is a perspective view of a battery cell for a secondary battery according to the related art.
Figure 2:
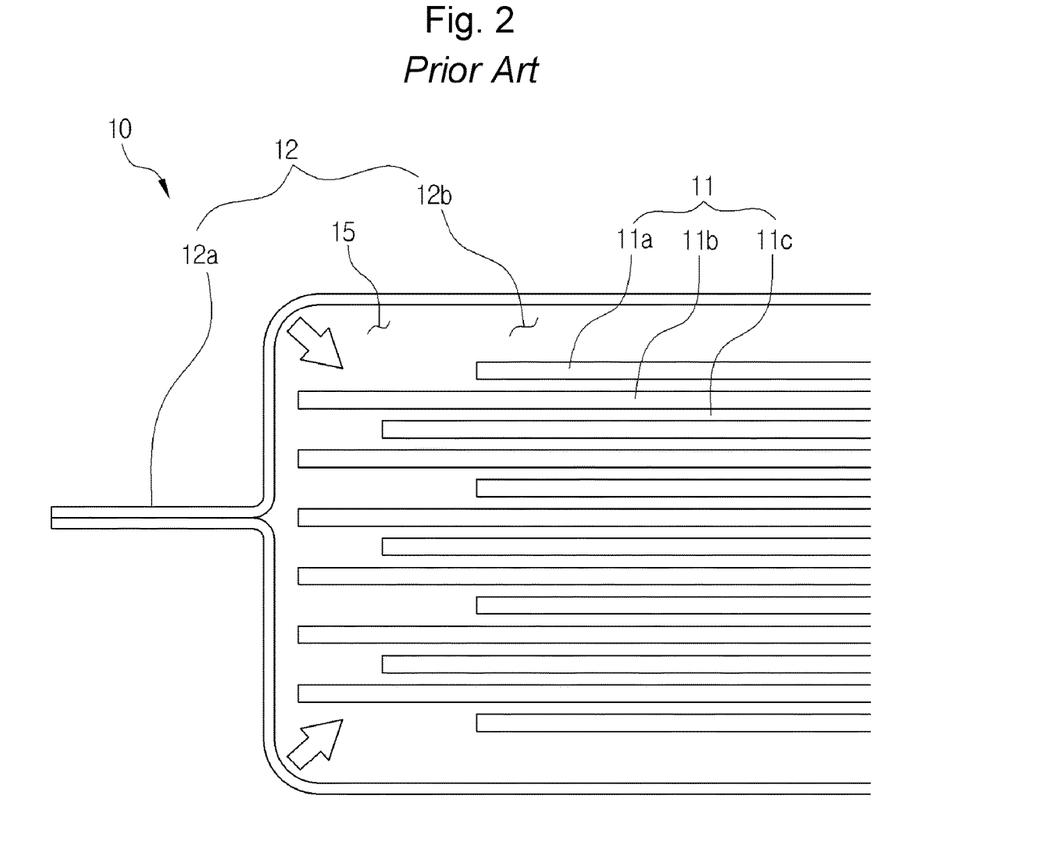
FIG. 2 is a partial cross-sectional view taken along the line AA' of FIG. 1.

FIG. 1 is a view showing a structure of a pouched cell of a secondary battery according to related art and FIG. 2 is a view showing a longitudinal cross-section of the pouched cell of the secondary battery according to the related art. As shown, the pouched cell 10 includes a battery part 11 and a case 12 including a battery part space 12b receiving the battery part 11. The battery part 11 has a shape in which a plurality of positive electrode plates 11a, separators 11b, and negative electrode plates 11c are stacked. The positive electrode plate 11a of the battery part 11 is electrically connected to a positive electrode tap 13 and the negative electrode plate 11c is electrically connected to a negative electrode tap 14.

In addition, the case 12 is a pouched type case having an intermediate layer formed of a metal foil, wherein the metal foil has an inner and outer cover layers attached to both surfaces thereof and made of an insulating film. Since the pouched type case has excellent formability, it may be freely bent. The case 12 is provided with the battery part space 12b capable of receiving the battery part 11 as described above and a closed surface 12a provided to a surface which is heat-sealed along an edge of the battery part space 12b.

The pouched cell 10 having the configuration described above adheres the case 12 and the battery part 11 to each other by vacuum adsorption in a state in which the battery part 11 is received in the case 12 (see arrows). However, since each of the positive electrode plate 11a, the separator 11b, and the negative electrode plate 11c of the battery part 11 has a size different from each other, the case 12 is manufactured while having some spare when forming the battery part space 12b of the case 12. As a result, at the time of the vacuum adsorption of the case 12, impact is applied to the battery part 11 due to a gap 15 between the case 12 and the battery part 11, such that the positive electrode plate 11a and the negative electrode plate 11c may be damaged due to the impact. Particularly, when a portion of the plates is separated by the impact to thereby float in the case 12, the pouched cell 10 may be damaged and performance may be degraded.

Therefore, a development of a battery cell for preventing the damage of the battery part 11 by minimizing the impact on the case 12 and the battery part 11 at the time of the vacuum adsorption of the case 12 has been demanded.

SUMMARY

An embodiment of the present invention is directed to providing a battery cell for a secondary cell including a case having a battery part space having the same shape as a battery part to minimize impact on the case and the battery part at the time of vacuum adsorption of an inner portion of the case in a state in which the battery part is received in the case, and a battery pack having the same.

In one general aspect, a battery cell for a secondary battery includes: a battery part including a plurality of first electrode plates and a plurality of second electrode plates alternately stacked thereon, and a separator inserted between the first electrode plate and the second electrode plate, the plurality of first electrode plates and the plurality of second electrode plates including an uppermost layer electrode plate stacked on an uppermost layer of the first electrode plate or the second electrode plate and a lowest layer electrode plate stacked on a lowest layer of the first electrode plate or the second electrode plate, wherein the first electrode plate is a positive electrode plate and the second electrode plate is a negative electrode plate; and a case receiving the battery part, wherein the separator has an area larger than that of the first electrode plate or the second electrode plate, the case is provided with a battery part space receiving the battery part, and a side surface of the battery part space is provided with a bending part along a bending surface of the battery part which is formed due to a step between the first electrode plate or the second electrode plate and the separator.

The battery part space may include: a first receiving space receiving the uppermost layer electrode plate and the lowest layer electrode plate; and a second receiving space receiving the battery part except for the uppermost layer electrode plate and the lowest layer electrode plate, and the first receiving space and the second receiving space may be partitioned by the bending part.

The battery cell may include a case including a first case enclosing one surface of the battery part including the uppermost layer electrode plate and a second case enclosing the other surface of the battery part including the lowest layer electrode plate, and the bending part may include: a first bending part formed on the first case and formed between the uppermost electrode plate and the separator, and a second bending part formed on the second case and formed between the lowest electrode plate and the separator.

In another general aspect, a battery cell for a secondary battery includes: a battery part including a plurality of first electrode plates and a plurality of second electrode plates alternately stacked thereon, and a separator inserted between the first electrode plate and the second electrode plate, the plurality of first electrode plates and the plurality of second electrode plates including an uppermost layer electrode plate stacked on an uppermost layer of the first electrode plate or the second electrode plate and a lowest layer electrode plate stacked on a lowest layer of the first electrode plate or the second electrode plate, wherein the first electrode plate is a positive electrode plate and the second electrode plate is a negative electrode plate; and a case receiving the battery part, wherein the separator has an area larger than that of the first electrode plate or the second electrode plate, the second electrode plate has an area larger than that of the first electrode plate, the case is provided with a battery part space receiving the battery part, and a side surface of the battery part space is provided with a third bending part along a bending surface of the battery part which is formed due to a step between the first electrode plate or the second electrode plate and the separator and a fourth bending part along a bending surface of the battery part which is formed due to a step between the first electrode plate and the second electrode plate.

The battery part space may include: a third receiving space receiving the uppermost layer electrode plate and the lowest layer electrode plate; a fourth receiving space receiving the first electrode plate or the second electrode plate neighboring to the uppermost layer electrode plate and the first electrode plate or the second electrode plate neighboring to the lowest layer electrode plate; and a fifth receiving space receiving the battery part except for the uppermost layer electrode plate, the first electrode plate or the second electrode plate neighboring to the uppermost layer electrode plate, the lowest layer electrode plate, and the first electrode plate or the second electrode plate neighboring to the lowest layer electrode plate, the third receiving space and the fourth receiving space may be partitioned by the third bending part, and the fourth receiving space and the fifth receiving space may be partitioned by the fourth bending part.

The battery cell may include a case including a third case enclosing one surface of the battery part including the uppermost layer electrode plate and a fourth case enclosing the other surface of the battery part including the lowest layer electrode plate, and the third bending part may include a 3-1-th bending part formed on the third case and formed between the uppermost electrode plate and the first electrode plate or the second electrode plate neighboring to the uppermost layer electrode plate, and a 3-2-th bending part formed on the fourth case and formed between the lowest electrode plate and the first electrode plate or the second electrode plate neighboring to the lowest layer electrode plate, and the fourth bending part may include a 4-1-th bending part formed on the third case and formed between the first electrode plate or the second electrode plate neighboring to the uppermost layer electrode plate and the separator, and a 4-2-th bending part formed on the fourth case and formed between the first electrode plate or the second electrode plate neighboring to the lowest layer electrode plate and the separator.

A battery pack for a secondary battery includes the battery cell as described above.

Other features and aspects will be apparent from the following detailed description, the drawings, and the claims.

| [Detailed Description of Main Elements] | |
|---|---|
| 100, 200: battery cell | 110, 210: battery part |
| 111, 211: first electrode plate | |
| 112, 212: separator | |
| 113, 213: second electrode plate | |
| 120, 220: case | 121, 221: closed surface |
| 122, 222: battery part space | |
| 130, 230: positive electrode tap | |
| 140, 240: negative electrode tap | |
| 150: bending part | 151: first bending part |
| 152: second bending part | 250: third bending part |
| 251: 3-1-th bending part | 252: 3-2-th bending part |
| 260: fourth bending part | 261: 4-1-th bending part |
| 262: 4-2-th bending part | |

DETAILED DESCRIPTION OF EMBODIMENTS

Hereinafter, a battery cell for a secondary battery according to an exemplary embodiment of the present invention will be described in detail with reference to the accompanying drawings.

First Embodiment

Figure 3:
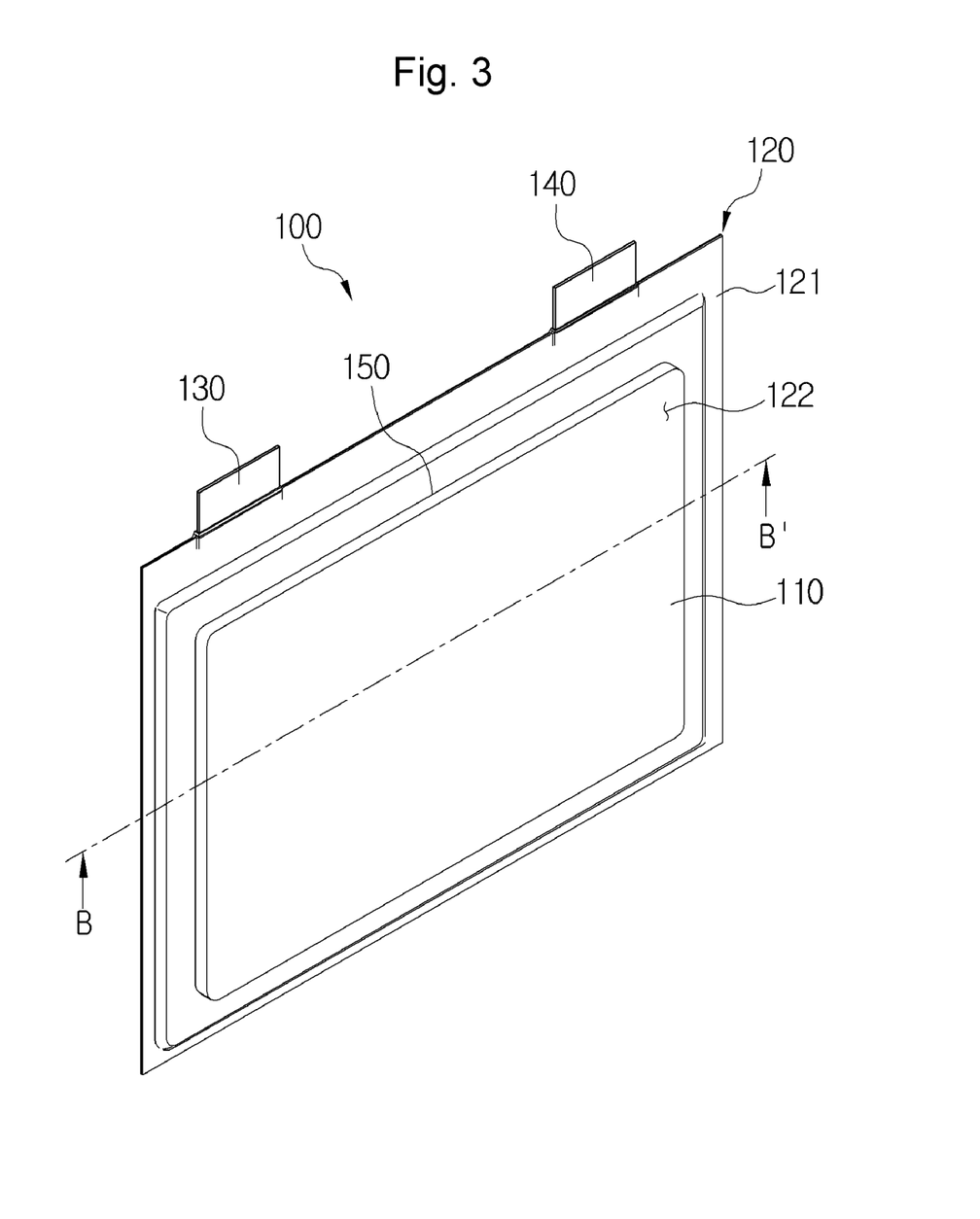
FIG. 3 is a perspective view showing a battery cell for a secondary battery according to a first embodiment of the present invention.
Figure 4:
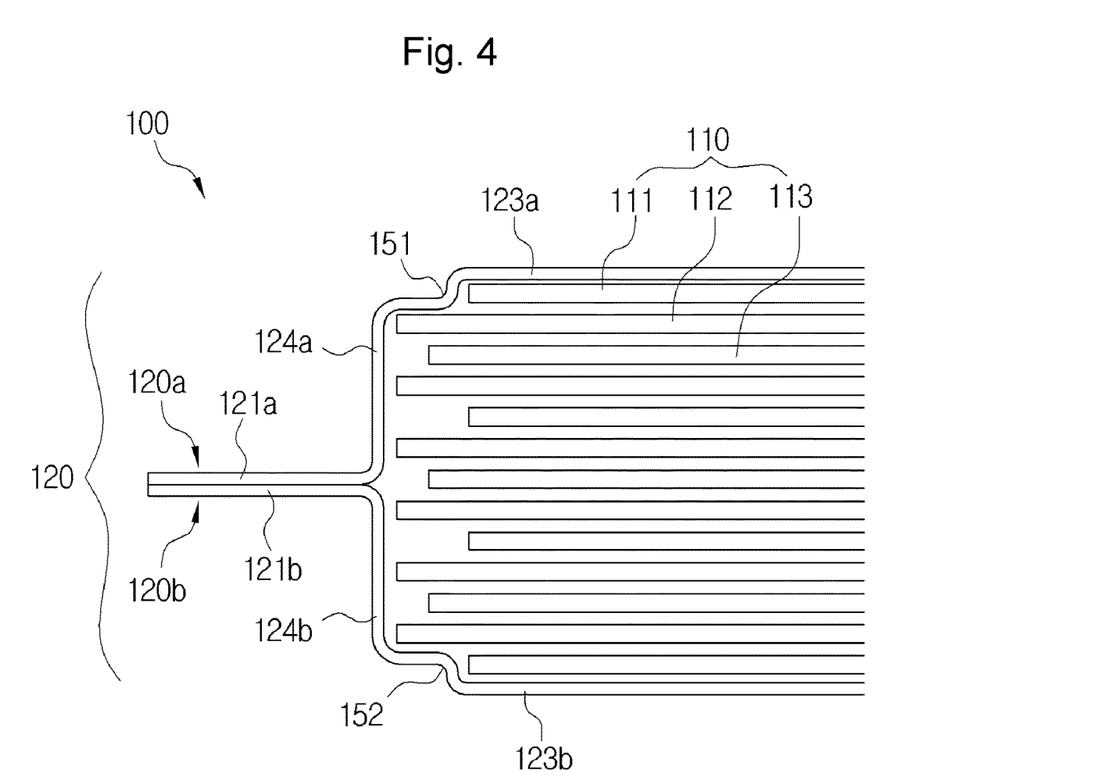
FIG. 4 is a partial cross-sectional view taken along the line BB' of FIG. 3.

FIG. 3 shows a perspective view of a battery cell 100 according to a first embodiment of the present invention and FIG. 4 shows a longitudinal cross-sectional view of the battery cell 100 according to the first embodiment of the present invention. As shown, the battery cell 100 may be configured to include a battery part 110, a case 120, a positive electrode tap 130, a negative electrode tap 140, and a bending part 150.

The battery part 110 may have a shape in which a plurality of first electrode plates 111, separators 112, and second electrode plates 113 are stacked. Specifically, the plurality of first electrode plates 111 and second electrode plates 113 may be alternately stacked and the separator 112 may be disposed between the alternately stacked first electrode plates 111 and second electrode plates 113. The battery part 110 may include an uppermost layer electrode plate which is stacked on an uppermost layer of the first electrode plate 111 or the second electrode plate 113 and a lowest layer electrode plate which is stacked on a lowest layer of the first electrode plate 111 or the second electrode plate 113. Although the drawings show the uppermost layer electrode plate and the lowest layer electrode plate as the first electrode plate 111, the uppermost layer electrode plate and the lowest layer electrode plate may be configured by the second electrode plate 113.

The first electrode plate 111 may be the uppermost layer electrode plate and the lowest layer electrode plate. The first electrode plate 111 may be disposed at both ends of the battery part 110. The first electrode plate 111 may be configured by a positive electrode plate and the second electrode plate 113 may be configured by a negative electrode plate. The separator 112 may have a cross-sectional area larger than that of the first electrode plate 111 and the second electrode plate 113 to prevent a short circuit between the first electrode plate 111 and the second electrode plate 113 and the first electrode plate 111 may have a cross-sectional area smaller than that of the second electrode plate 113. The positive electrode plate of the battery part 110 may be electrically connected to a positive electrode tap 140 and the negative electrode plate may be electrically connected to a negative electrode tap 140.

As described above, since the first electrode plate 111 has the cross-sectional area smaller that that of the separator 112, the battery part 110 may have a step generated at a boundary between the uppermost layer electrode plate and the separator 112 neighboring thereto. Therefore, the case 120 receiving the battery part 110 according to an embodiment of the present invention may have the following configuration so that the battery part 110 is closely received in the case 120.

The case 120 may be formed in a battery part space 122 receiving the battery part 110 and may be provided with a closed surface 121 which is heat-sealed along an edge of the battery part space 122. In this case, the bending part 150 corresponding to the step of the boundary between the first electrode plate 111 and the separator 112 described above may be formed on the case 120 having the battery part space 122 formed therein. The bending part 150 may be formed along a bent surface of the battery part 110 which is formed due to the step between the first electrode plate 111 and the separator 112. The battery part space 122 may include a first receiving space receiving the first electrode plate 111 and a second receiving space receiving the remaining battery part except for the first electrode plate 111, wherein the first receiving space and the second receiving space may be partitioned by the bending part 150. Hereinafter, a configuration of the bending part 150 will be described in detail.

The case 120 may include a first case 120a enclosing one surface of the battery part 110 and a second case 120b enclosing the other surface of the battery part 110. The first case 120a and the second case 120b may be formed integrally with each other to be coupled (single forming) by folding it in half or may be formed separately from each other to be coupled (double forming). The first case 120a may include a first closed surface 121a for coupling with the second case 120b, a first battery part surface 123a enclosing one surface of the battery part 110, and a first battery part side surface 124a enclosing a side surface of the battery part 110. A first bending part 151 of the bending part 150 formed at the first case 120a may be formed on the first battery part side surface 124a. The first bending part 151 may be formed along a boundary part between the first electrode plate 111 and the separator 112 neighboring to the first electrode plate 111 disposed on the uppermost layer of the battery part 110.

Therefore, when the battery part 110 is received in the case 120 through the first bending part 151, a spare space, that is, a gap may be minimized.

The second case 120b may include a second closed surface 121b for coupling with the first case 120a, a second battery part surface 123b enclosing the other surface of the battery part 110, and a second battery part side surface 124b enclosing a side surface of the battery part 110. In this case, a second bending part 152 of the bending part 150, which is formed at the second case 120b may be formed on the second battery part side surface 124b. The second bending part 152 may be formed along a boundary part between the first electrode plate 111 disposed on the lowest layer of the battery part 110 and the separator 112 neighboring to the first electrode plate 111 disposed on the lowest layer of the battery part 110. Therefore, when the battery part 110 is received in the case 120 through the second bending part 152, a spare space, that is, a gap may be minimized.

Second Embodiment

Figure 5:
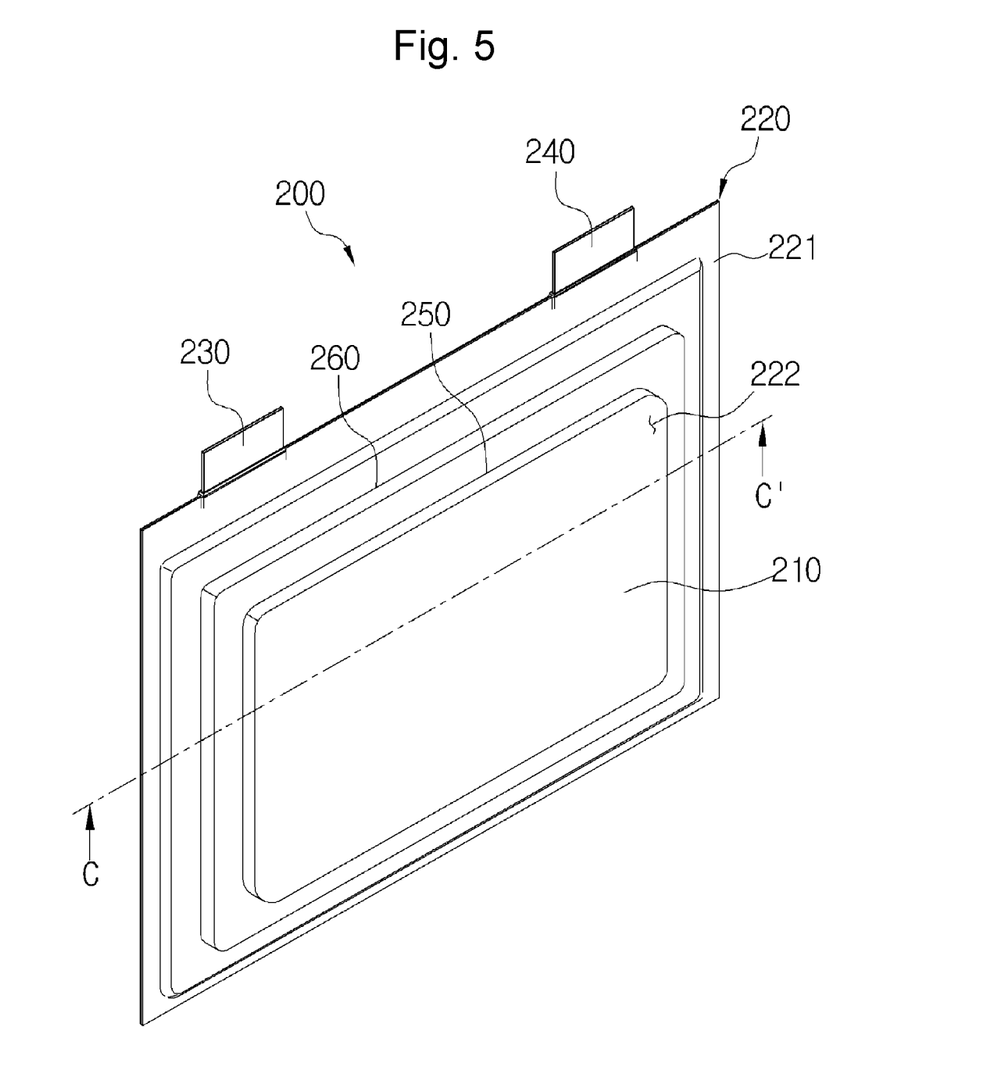
FIG. 5 is a perspective view showing a battery cell for a secondary battery according to a second embodiment of the present invention.
Figure 6:
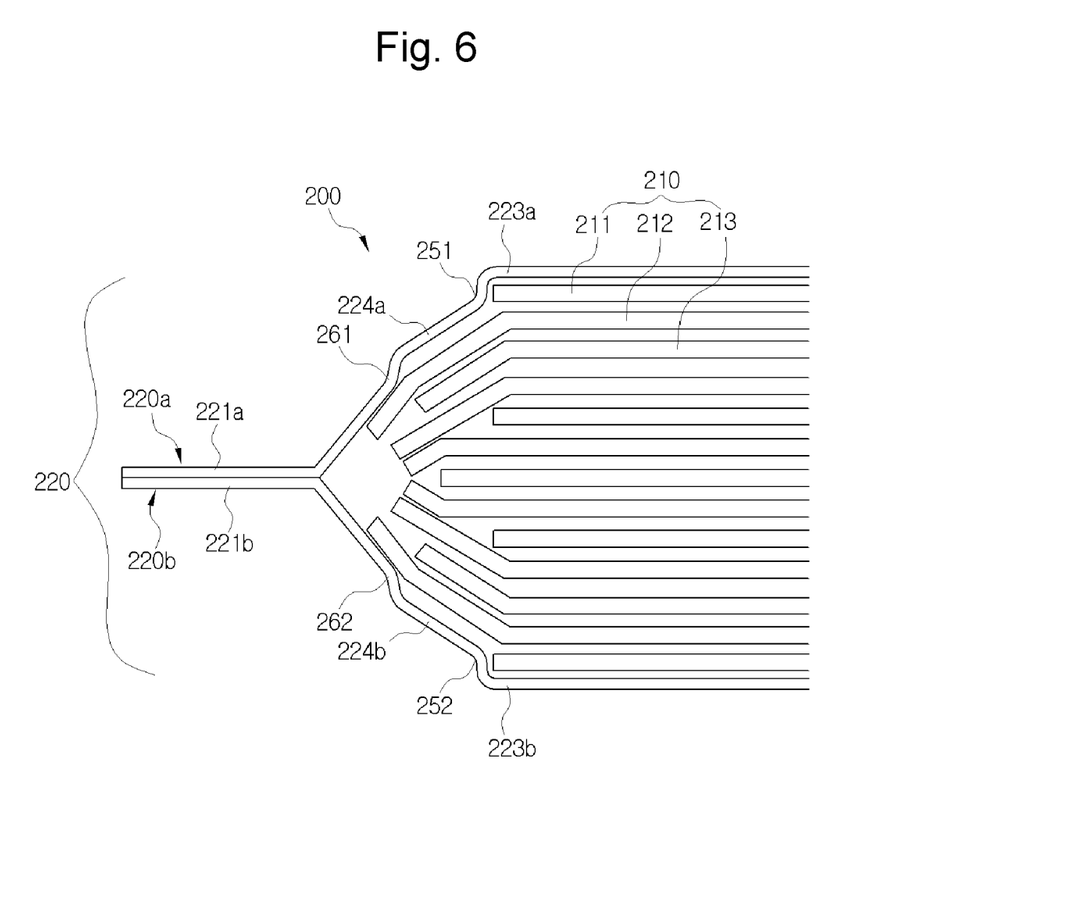
FIG. 6 is a partial cross-sectional view taken along the line CC' of FIG. 5.

FIG. 5 shows a perspective view of a battery cell 200 according to a second embodiment of the present invention and FIG. 6 shows a longitudinal cross-sectional view of the battery cell 200 according to the second embodiment of the present invention. As shown, the battery cell 200 may be configured to include a battery part 210, a case 220, a positive electrode tap 230, a negative electrode tap 240, a third bending part 250, and a fourth bending part 260. The battery part 210 may include an uppermost layer electrode plate which is stacked on an uppermost layer of the first electrode plate 211 or the second electrode plate 213 and a lowest layer electrode plate which is stacked on a lowest layer of the first electrode plate 211 or the second electrode plate 213. Although the drawings show the uppermost layer electrode plate and the lowest layer electrode plate as the first electrode plate 211, the uppermost layer electrode plate and the lowest layer electrode plate may be configured by the second electrode plate 213.

The battery cell 200 according to the second embodiment of the present invention has the same configuration as the battery cell 100 according to the first embodiment of the present invention described above except for a configuration of the case 220. Therefore, the configuration of the case 220 will be described below in detail.

As shown in FIG. 6, considering that the battery cell 200 according to the second embodiment of the present invention has the separator 212 which is folded at the time of vacuum adsorption of an inner portion of the case 220, the case 220 has been configured as follows.

As described above, in the case in which the separator 212 is folded by the vacuum absorption, since the first electrode plate 211 has a cross-sectional area smaller than that of the second electrode plate 213, the battery part 210 has a step generated at a boundary between an uppermost layer electrode plate (the first electrode plate 211 in FIG. 6) stacked on an uppermost layer of the battery part 210 and a second electrode plate 213 neighboring to the uppermost layer electrode plate. In addition, the step may be generated at a boundary between the second electrode plate 213 neighboring to the uppermost layer electrode plate and the separator 212. Therefore, the case 220 receiving the battery part 210 according to the second embodiment of the present invention may have the following configuration so that the battery part 210 is closely received in the case 220.

The case 220 may be formed in a battery part space 222 receiving the battery part 210 and may be provided with a closed surface 222 which is heat-sealed along an edge of the battery part space 222. In this case, the case 220 having the battery part space 222 formed therein may be provided with the third bending part 250 corresponding the step of the boundary between the uppermost layer electrode plate (the first electrode plate 211 in FIG. 6) and the second electrode plate 213 neighboring to the uppermost layer electrode plate and the fourth bending part 260 corresponding to the step of the boundary between the second electrode plate 213 neighboring to the uppermost layer electrode plate and the separator 212 neighboring to the second electrode plate 213. The battery part space 222 may include a third receiving space receiving the uppermost layer electrode plate, a fourth receiving space receiving the second electrode plate 213 neighboring to the uppermost layer electrode plate, and a fifth receiving space receiving the remaining battery parts except for the uppermost layer electrode plate and the second electrode plate 213 neighboring to the uppermost layer electrode plate. The third receiving space and the fourth receiving space may be partitioned by the third bending part 250 and the fourth receiving space and the fifth receiving space may be partitioned by the fourth bending part 260. Hereinafter, a configuration of the third bending part 250 and the fourth bending part 260 will be described in detail.

The case 220 may include a third case 220a enclosing one surface of the battery part 210 and a fourth case 220b enclosing the other surface of the battery part 210. The third case 220a and the fourth case 220b may be formed integrally with each other to be coupled (single forming) by folding it in half or may be formed separately from each other to be coupled (double forming). The third case 220a may include a first closed surface 221a for coupling with the fourth case 220b, a first battery part surface 223a enclosing one surface of the battery part 210, and a first battery part side surface 224a enclosing a side surface of the battery part 210. A 3-1-th bending part 251 of the third bending part 250 formed at the third case 220a may be formed on the first battery part side surface 224a. The 3-1-th bending part 251 may be formed along a boundary part between the uppermost layer electrode plate (the first electrode plate 211 in FIG. 6) of the battery part 210 and the second electrode plate 213 neighboring to the uppermost layer electrode plate. In addition, a 4-1-th bending part 261 of the fourth bending part 260 formed at the third case 220a may be formed so as to be space apart from the 3-1-th bending part 251 on the first battery part side surface 224a by a predetermined distance in a downward direction. The 4-1-th bending part 261 may be formed along a boundary part between the second electrode plate 213 disposed to neighbor to the uppermost layer electrode plate of the battery part 210 and the separator 212 neighboring to the second electrode plate 213. Therefore, when the battery part 210 is received in the case 220 through the 3-1-th bending part 251 and the 4-1-th bending part 261, a spare space, that is, a gap may be minimized.

The fourth case 220b may include a second closed surface 221b for coupling with the third case 220a, a second battery part surface 223b enclosing the other surface of the battery part 210, and a second battery part side surface 224b enclosing a side surface of the battery part 210. In this case, a 3-2-th bending part 252 of the third bending part 250 formed at the fourth case 220b may be formed on the second battery part side surface 224b. The 3-2-th bending part 252 may be formed along a boundary part between a lowest layer electrode plate (the first electrode plate 211 in FIG. 6) of the battery part 210 and the second electrode plate 213 neighboring to the lowest layer electrode plate. In addition, a 4-2-th bending part 262 of the fourth bending part 262 formed at the fourth case 220b may be formed so as to be space apart from the 3-2-th bending part 252 on the second battery part side surface 224b by a predetermined distance in an upward direction. The 4-2-th bending part 262 may be formed along a boundary part between the second electrode plate 213 disposed to neighbor to the lowest layer electrode plate of the battery part 210 and the separator 212 neighboring to the second electrode plate 213. Therefore, when the battery part 210 is received in the case 220 through the 3-2-th bending part 252 and the 4-2-th bending part 262, a spare space, that is, a gap may be minimized.

A battery pack for a secondary battery according to an embodiment of the present invention having the battery cell 100 according to the first embodiment of the present invention or the battery cell 200 according to the second embodiment of the present invention stacked in plural, may be configured to include a case receiving the battery cell 100 or 200 and a typical terminal and battery management system (BMS) received in the case.

According to the embodiment of the present invention, in the battery cell for the secondary battery and the battery pack having the same, since the battery case is received in the state in which it is closely adhered to the case to minimize the impact at the time of the vacuum adsorption of the case, the damage to the battery part may be prevented and the degradation in performance of the battery cell may also be prevented. In addition, when the battery cell is manufactured, the size of the battery cell may be precisely designed by precisely controlling the numerical value of the battery part space of the case.

The present invention should not be construed to being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:

1. A battery cell for a secondary battery, the battery cell comprising:
    a battery part including a plurality of first electrode plates and a plurality of second electrode plates alternately stacked, and a separator inserted between neighboring first electrode plate and second electrode plate,
    wherein the first electrode plates are a positive electrode plate and the second electrode plates are a negative electrode plate, and an uppermost electrode plate layer and a lowest electrode plate layer are formed of a first electrode plate or a second electrode plate; and
    a case having a battery part space where the battery part is received,
    wherein the separator inserted between the neighboring first electrode plate and second electrode plate has an area larger than that of the neighboring first electrode plate and second electrode plate, and an edge portion of the separator protrudes from edges of the neighboring first electrode plate and second electrode plate and is bent to form a bent portion in the separator, and the case has a bending part formed conforming to the bent portion of the separator,
    wherein the bent portion includes a first bent portion bent toward the lowest electrode plate layer, and a second bent portion bent toward the uppermost electrode plate layer; and the bending part includes a first bending part conformed with the first bent portion, and a second bending part conformed with the second bent portion, and wherein the first and second bending parts are symmetrical with respect to a line of symmetry extending along a central longitudinal axis of the case.

2. A battery pack for a secondary battery comprising the battery cell of claim 1.

* * * * *